Jan. 24, 1967 T. H. FLOWERS 3,300,588

LINE CIRCUITS FOR SUBSCRIBERS' TELEPHONES

Filed Dec. 27, 1963

THOMAS H. FLOWERS

INVENTOR

BY Hall & Houghton

ATTORNEY 3,300,588

LINE CIRCUITS FOR SUBSCRIBERS' TELEPHONES

Thomas Harold Flowers, London, England, assignor to Her Majesty's Postmaster General, London, England Filed Dec. 27, 1963, Ser. No. 333,806
Claims priority, application Great Britain, Jan. 3, 1963, 408/63
4 Claims. (Cl. 179—70)

Figure 1:
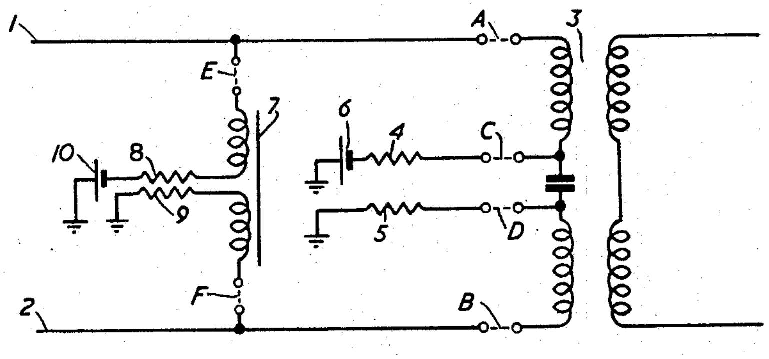

This invention relates to transmission feed arrangements in telephone exchange systems in which the feed current is delivered via a transformer individual to each line, and in which it is required that different lines shall receive different values of feed current, and it applies particularly but not exclusively to the electronic telephone exchange system described in United States patent specification No. 3,213,202. That specification describes an exchange system in which a 2-wire incoming line is terminated by a hybrid transformer for connection to 4-wire exchange equipment, the transmission feed current for the incoming line being connected via the hybrid transformer. This system is designed for use with a type of telephone instrument requiring a transmission feed current within the range of 10 to 20 milliamperes and referred to as a low-current type instrument, which is considerably lower than the transmission feed current required by telephone instruments commonly in use at the present time and which lies within the range of 30 to 100 milliamperes. The latter instruments are called high-current type instruments.

If such an exchange system is introduced into an existing telephone area it may be impracticable to restrict the lines connected to it to subscribers' lines fitted with the low-current type instrument, and it may be necessary to transfer to the new exchange from existing exchanges in the area, lines having high-current instruments in order, for example, to relieve congestion. Thus the problem exists as to whether the transferred lines, should have their instruments changed for low-current types, or whether the existing instruments should be retained and measures taken at the exchange to provide these particular lines with a high-current transmission feed.

In the event of the instruments being changed, it is necessary, in order to prevent any interruption of service, for the high-current instruments to be operative up to the moment of transfer to the new exchange, and the low-current instruments operative immediately after the transfer, and the accomplishment of this leads to practical difficulties.

An alternative is to provide, in the exchange, different transformer terminations to cater for different ranges of transmission feed currents and terminate each incoming line in accordance with the requirements of the telephone instrument fitted to the line. This however leads to duplication of transformer terminations in the exchange, with the consequent increase in both space and cost, this factor being increased not only by the number of terminations, but also because transformers for the higher range of current feed will of necessity be larger and more expensive than the transformers for the lower current ranges.

It is an object of the present invention to provide in a telephone exchange system in which incoming lines are each terminated on a transformer type of transmission feed, and in which different lines may require widely different values of feed current, an arrangement by which each line is terminated by a similar transformer designed to carry the minimum range of feed current required and that the actual value of feed current received by a given line may be increased in excess of this range, without the necessity of changing the transformer terminating that line.

According to the present invention in a telephone exchange system in which transmission feed current is fed to a line via a transformer and in which different exchange lines are required to be fed with different values of D.C. feed current, each line is terminated on a similar transformer which in operation will supply a specified range of current and, in addition, each line which is required to have a feed current in excess of a specified range is connected in parallel to a high impedance source of D.C. feed current which, in operation, supplies current in excess of that supplied by the transformer feed, or it may supply all the current, the D.C. feed current to the transformer being disconnected from any source of feed current.

Line circuits embodying the invention will now be described in greater detail with reference to the accompanying drawings which are circuit diagrams.

FIG. 1 shows the basic features of the invention. Conductors 1 and 2 of an incoming line are terminated via straps A and B, on the primary windings of a transformer 3. As shown, the windings are joined via straps C and D in series with resistors 4 and 5 to source 6 of D.C. feed current. This D.C. feed is controlled by resistors 4 and 5 to provide a low range of current to the line, and transformer 3 is limited to carrying only such a low range of current. If a line feed current in excess of that provided by the transformer is required, the line is parallel-connected by straps E and F to choke coil 7 which is connected via resistors 8 and 9 to D.C. potential source 10 which may be the same as source 6 to which the transformer is connected. The impedance of coil 7 is high so that it provides a negligible shunt path for speech currents.

Straps C and D may be left connected in which case the total line feed current will be in part supplied via the transformer and the remainder via the choke coil. Alternatively, straps C and D may be disconnected, leaving all the line current to be supplied via the choke coil.

Theoretically, there is no advantage either way, but from a practical point of view one arrangement may show some advantage over the other because in the second case there is no D.C. current flow through the transformer.

Conductors 51 and 52 of an incoming line terminate on two parallel connected sources of transmission feed current. The first of these is hybrid transformer 53 which provides bothway transmission between the 2-wire line and 4-wire multiplex highways 514 and 515. The line conductors 51 and 52 terminate on the primary of the hybrid transformer 53, which primary is split and includes a capacitor 56 at its centre. Straps C and D and feed resistors 54 and 55 connect respectively to the exchange battery, assumed —50 volts, and earth via resistors 59 and 57 in the secondary circuit of hybrid transformer 53. This hybrid transformer is designed to carry a limited feed current lying within a range of 10 to 20 milliamperes, as required for a low-current type of telephone instrument. The second transmission feed is a high-impedance feed circuit. Line conductors 51 and 52 are connected by straps E and F to choke coils 21 and 22 in series with feed resistors 23 and 24 respectively to the same battery, assumed —50 volts and earth, as the hybrid transformer 53. This high-impedance feed circuit therefore provides feed current in parallel with that provided by the hybrid transformer 53, the resistors 23 and 24 being of such value to determine the value of current provided in excess of that supplied by the hybrid transformer. Thus for instance, when the line conductors 51 and 52 are connected to a telephone instrument requiring a feed current in the region of 100 milliamperes, the exchange termination arranged in accordance with the invention, will, provide say 20 milliamperes via the hybrid transformer 53 and the remaining 80 milliamperes via the choke coils 21 and 22. As before, the impedance of choke coils 21 and 22 is high so as to provide negligible shunting of the speech circuit.

Alternatively, strap C may be disconnected, in which case the choke coil feed supplies all of the feed current and is so designed. In this case, it should be noted that as current through resistor 55 connected to the output side of the transformer 53 is used as a calling signal to the modulator, this current must be maintained at its correct value, and this could involve the introduction of further resistance connected, say, in place of strap D.

The terminals for making the strap connections A–F would be provided in any of the well known ways such as on the M.D.F. or some other form of cross connection field.

Provision may be made for the testing from a test desk of exchange lines by the provision of rectifiers. Desirably, the rectifiers are connected in the D.C. loop paths only of the exchange lines. If both the above described sources of feed current are used four rectifiers are required. Normally, however, the feed source used will be that including the choke coils when only two rectifiers are necessary.

Although the embodiment described above with reference to FIG. 2 employs 2-wire–4-wire transmission involving the use of hybrid transformers, the system may be entirely 2-wire, in which case only a simple transformer will be required, but this will in no way affect the purpose of the invention.

Figure 2:
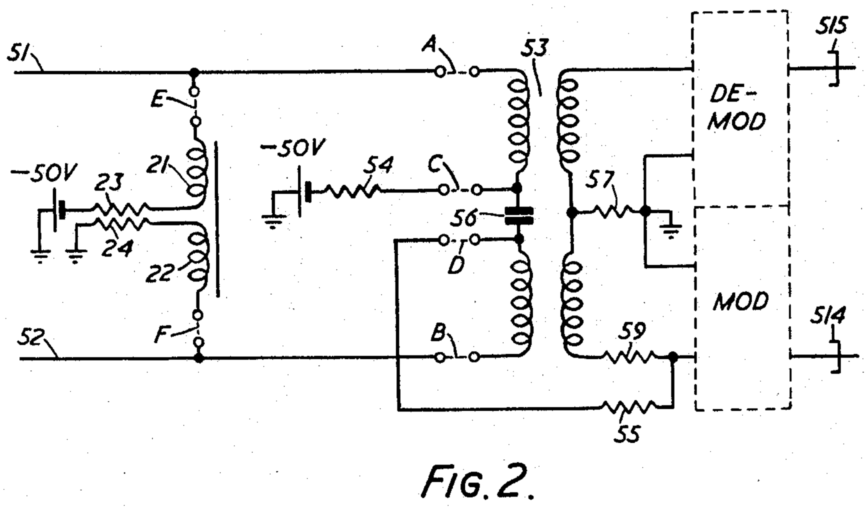

The line termination embodying the invention shown in FIG. 2 is suitable for incorporation in the system described in United States Patent Specification No. 3,213,202. The termination replaces that shown in FIG. 5 of the drawings accompanying that specification and is similarly designated.

I claim:

1. A line circuit for a subscriber's telephone instrument comprising in combination first and second line conductors, a subscriber's line transformer, an input winding on said transformer in series connection with said first and second conductors, a first source of line feed current, connection from said first source to said input winding to provide feed current through said input winding to said conductors, a second source of line feed current, and connection means of high impedance to currents of speech frequency connecting the said second source across said first and second conductors in parallel connection with said input winding to provide feed current direct to said first and second conductors.

2. A line circuit for a subscriber's telephone instrument comprising in combination first and second line conductors, a subscriber's line transformer, an input winding on said transformer in series connection with said first and second conductors, a source of line feed current, and connection means of high impedance to currents at voice frequency connecting said source across said first and second conductors in parallel with said input winding to provide feed current direct to said first and second conductors.

3. A line circuit for a subscriber's telephone instrument comprising in combination first and second line conductors, a subscriber's line transformer, a two-part input winding on said transformer, a capacitor interconnecting said parts of said two-part winding, removable connection straps connecting said two-part winding in series with said first and second conductors, a first source of line feed current further removable connection straps connecting said first source across said capacitor to provide line feed current to said first and second conductors through said two-part input winding, a second source of line feed current and connectors of high impedance to currents of voice frequency and including other removable straps, said connectors connecting said second source across said first and second conductors in parallel with said two-part input winding thereby to provide feed current direct to said conductors.

4. A line circuit for a subscriber's telephone instrument comprising in combination first and second line conductors, a subscriber's line transformer, split input windings on said transformer, a capacitor interconnecting said split input windings, removable connection straps connecting said split input windings in series with said first and second conductors, first and second chokes of high impedance to currents of voice frequency, a source of line feed current connected between said first and second chokes and further removable connection straps connecting said first and second chokes and interconnected source of line feed current across said first and second conductors in parallel with said split input windings thereby to provide feed current direct to said first and second conductors.

References Cited by the Examiner

UNITED STATES PATENTS

| | | | |
|---|---|---|---|
| 669,710 | 3/1901 | Scribner | 179—70 |
| 1,367,571 | 2/1921 | Thompson | 179—70 |
| 1,415,868 | 5/1922 | Darrow | 179—70 |

KATHLEEN H. CLAFFY, *Primary Examiner.*

J. W. JOHNSON, L. A. WRIGHT, *Assistant Examiners.*